United States Patent [19]

Smart

[11] 3,763,361

[45] Oct. 2, 1973

[54] COMPUTING CIRCUITS FOR THE CALCULATION OF THE STANDARD DEVIATION OF AN INPUT SIGNAL

[75] Inventor: Edwin Robert Smart, Horsham, Sussex, England

[73] Assignee: Telomex Group Limited, Horsham, Sussex, England

[22] Filed: Mar. 8, 1971

[21] Appl. No.: 121,781

[30] Foreign Application Priority Data
Mar. 9, 1970  Great Britain.................... 11,143/70

[52] U.S. Cl............. 235/151.13, 235/183, 328/127
[51] Int. Cl............................................. G06g 7/18
[58] Field of Search...................... 235/151.13, 183, 235/92 QC, 92 NT, 92 CP, 151.1; 328/127

[56] References Cited
UNITED STATES PATENTS

| | | | |
|---|---|---|---|
| 3,532,862 | 10/1970 | Dahlin ............................ | 235/151.1 |
| 3,488,482 | 1/1970 | Ley...................................... | 235/183 |
| 3,146,344 | 8/1964 | Palmer............................ | 235/151.13 |
| 3,151,237 | 9/1964 | Hrabak .......................... | 235/151.13 |
| 3,471,685 | 10/1969 | Bishop .......................... | 235/151.13 |
| 3,529,140 | 9/1970 | Doering .......................... | 235/183 X |
| 3,534,402 | 10/1970 | Crowell et al. ............. | 235/151.13 X |
| 3,584,203 | 6/1971 | Patzelt et al................. | 235/151.3 X |

FOREIGN PATENTS OR APPLICATIONS
1,548,794  9/1969  Germany ............................ 328/127

*Primary Examiner*—Felix D. Gruber
*Attorney*—Norris & Bateman

[57] ABSTRACT

A computing circuit for computing the standard deviation of a group of signals such as signals representing the weights of a series of articles during production or packaging is disclosed. The signals are fed into a network which splits the signals up into sub-groups and the range of each sub-group is determined. A signal representing a predetermined proportion of the range is fed to an integrating circuit such that the sum of these portions represents the division of the mean of the ranges of the sub-groups by a factor known as the "mean range factor" the size of this factor varying with the number of signals in each sub-group. A method of determining the mean of the values of the signals using the same method is disclosed. In this method the deviation of each signal from an assumed mean is determined and divided by a signal representative of the number of signals in the group to provide an increment signal. The increment signals are then summed to provide a signal representing the true mean.

5 Claims, 1 Drawing Figure

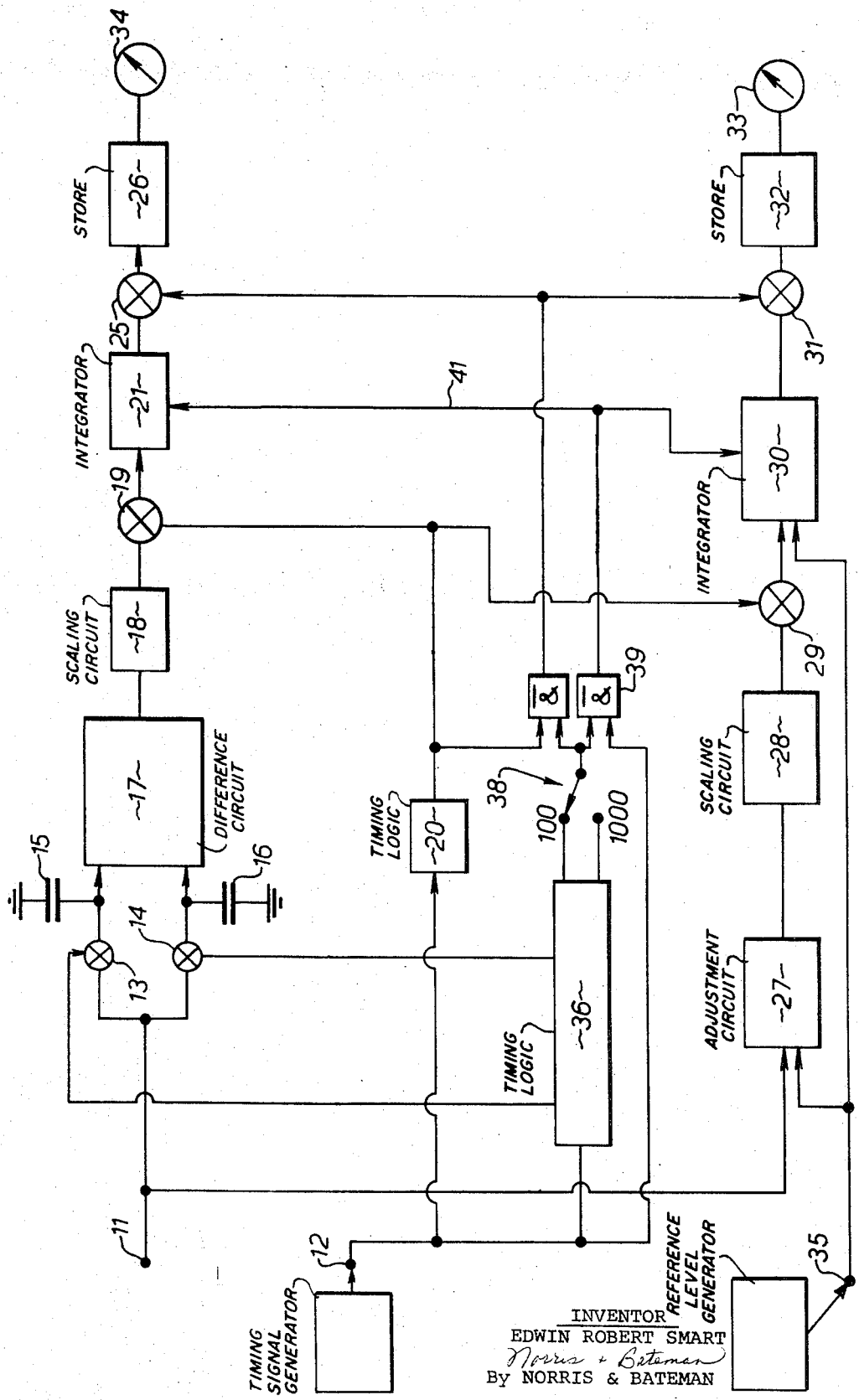

COMPUTING CIRCUITS FOR THE CALCULATION OF THE STANDARD DEVIATION OF AN INPUT SIGNAL

BACKGROUND OF THE INVENTION

The present invention relates to computing circuits and particularly to circuits for computing the mean deviation value and the standard deviation of a group of input signals.

The present invention finds particular utility in connection with apparatus for the production of large quantities of a product with a particular specified property. The variation of such a property in each item of the product follows a known (Gaussian) distribution if the cause of variation is a random one. The sample mean gives the average value of the specified property for the product and the standard deviation gives an indication of the spread of values of the specified property likely to occur in the product. A typical property with which production may be concerned is the weight of packages produced by a filling machine.

SUMMARY OF THE INVENTION

According to one aspect of the present invention a device for computing the standard deviation of a group of signals comprises means for separating the group into a plurality of sub-groups of the signals, means for determining the range of each sub-group, and means for summing a predetermined portion of the range of each sub-group.

Preferably the device is adapted to receive the group of signals sequentially and the means for separating the group of signals into sub-groups comprises means for storing each sequentially received signal until the respective sub-group is assembled. Preferably the means for storing the sequentially received signals comprises a capacitor for each signal in the sub-group and a switch for connecting an input line along which the signals are received to a respective capacitor upon the reception of each succeeding signal. Alternatively the sequentially received signals may be stored in digital form and the following operations on the signals so stored may be carried out using conventional methods of handling digital information.

It is an object of the invention to provide a device for computing the means deviation value of a group of signals which comprises means for dividing the deviation of each signal from an assumed mean by the number of signals in the group to provide an increment signal and means for summing the increment signals, It is another object of the invention to provide a means of measuring and displaying automatically the standard deviation of a property of the products of a production plant whilst the plant is continuously operating. This can be done provided the property can be converted by suitably fast acting equipment into an electrical signal of analog form proportional to the value of the property concerned. Thus, for example, a linear weight transducer would provide a suitable signal which may be fed into a device constructed in accordance with the invention to obtain the standard deviation of weight distribution in the production of packages. By the addition of extra equipment the sample mean deviation, or average deviation value, of the property may also be obtained and displayed.

It is a further object of the invention to provide a method of carrying out repeatedly and automatically the 'Mean Sample Range' method of measuring the standard deviation of a number of samples, this method being described in standard statistics literature. The method comprises the steps of dividing the samples into convenient sub-groups of 2, 3, 4, 5 or more and determining the range, '$\overline{w}$,' of each sub-group. The average of the sub-group ranges, '$w$,' is next determined and this value is then divided by a constant known as the means range factor. Suitable values for this factor are given for example in Biometrika Tables for Statisticians, Volume 1, Table 27. Thus, for a sub-group of 2, the factor is 1.128; for a sub-group of 3, the factor is 1.693.

The results of division of $\overline{w}$ by the factor is the value of the standard deviation for all the samples considered.

One embodiment of the invention will now be described by way of example with reference to the accompanying drawing.

BRIEF DESCRIPTION OF THE DRAWING

The Drawing illustrates a circuit capable of both standard deviation and mean value measurement.

DESCRIPTION OF THE PREFERRED EMBODIMENT

Referring now to the drawing two inputs 11 and 12 are shown, 11 for analog signals proportional to the variable to be assessed, for example, weight, and 12 for a timing signal to indicate when the analog signal is to be accepted, that is for example, when a package is on the weight transducer.

The analog input signals are separated into sub-groups of two signals each by routing means comprising two switches 13 and 14 which are alternately closed for a short time by the timing pulses via a logic circuit 36. The switches 13 and 14 thus allow the analog signals to charge two storage condensers 15 and 16 alternately. These condensers remain charged during the time switches 13 and 14 are open.

The potential on the condensers 15 and 16 is detected by a circuit for determining the statistical range of the signal, since the sub-groups comprise two signals in this embodiment the range determining means is in the form of a difference circuit 17 which gives an output voltage proportional to the magnitude of the difference between the two charges, that is the polarity of the difference between the two charges does not affect the output of the difference circuit 17.

It will be appreciated, however, that a different range determining circuit would be required if sub-groups containing different numbers of signals were used.

The output of difference circuit 17 is then passed by a scaling circuit 18 to another switch 19.

When two charges have been stored on capacitors 15 and 16 and their difference determined by the difference circuit 17 the switch 19 is closed for a short known time derived from a timing logic circuit 20 and a current proportional to the potential of the input of scaling circuit 18 is passed to an integrating circuit 21.

The next analog signal from the input 11 is then passed to capacitor 15 or 16, the unchanged capacitor 16 or 15 remaining with its previous charge. The process is repeated. The integrating circuit 21 continues to operate until a predetermined number of timing pulses from input line 12 have been counted by the logic circuit 36. At the end of say 100, or 1,000 signals (determined by the position of a changeover switch 38) the output of the integrating circuit 21 is passed via a switch 25 to a storage circuit 26, the integrating circuit 21 is then reset to zero charge by an output from AND gate 39 and a reset line 41, and the process repeated for the next 100, or 1,000 signals. The output of the storage circuit 26 is then displayed on a meter, digital voltmeter or permanent recording mechanism 34 until another 100 or 1,000 signals have been counted and the display changed.

In the above operation the difference between each pair of input signals at the output of difference circuit 17 is taken as the value '$w$' referred to earlier, the integrating circuit 21 and scaling circuit 18 provide the term $w$/mean range factor for the predetermined group of say, 100 or 1,000 signals. As in this circuit each signal is used twice for sub-group range measurement the mean range factor for separate sub-groups of two, 1.128, is modified to allow for the increased use of each input signal used in this computation. Thus the output display from the storage circuit 26 can be calibrated in units concerned with the original property to be assessed, e.g., gms. weight, and the standard deviation of the last group of 100 or 1,000 signals can be read and recorded directly.

This method has the advantage that the standard deviation can be obtained without having to establish the mean value of the property being observed. This mean value is not normally known until the measurements of the sample have been completed and, even if it could be estimated, very precise adjustment of the equipment for determining standard deviation would be needed to avoid producing a continual error input signal.

In the circuit described the differences which represent the range of each sub-group are taken from a pair of signals, the next difference being from one of the signals of this pair and the succeeding signal. The sample size of 2 and the double use of each signal for subgroup range measurement is chosen as needing the simplest circuit for economy. By modification of the logic circuit each difference could be taken from successive pairs; this however requires a more complex circuit. Sub-groups of 3, 4 or 5 or more could be used in this type of circuit but would require a large increase in logic circuits and storage capacitor systems in place of the capacitors 15 and 16; thus these sub-group sizes are not preferred for practical operations.

A display of the average deviation value of the property being assessed can also be provided for the preceding, say, 100 or 1,000 signals by means of additional circuits. The analog input 11, is fed to a level adjustment circuit 27 which adjusts the level of the input signal to produce an error signal in dependence on the value of a reference signal from a reference signal generator 35.

This adjusted signal then passes via a scaling circuit 28 to a switch 29 which is closed for a short known time similar to switch 19. A charge proportional to the input potential of the scaling circuit 28 is passed via switch 29 to an integrator 30 which operates on successive input signals until the required sample number say 100 or 1,000 is completed. The integrator 30 is also fed with the reference signal from the generator 35 which represents an assumed mean. If the incoming signals after processing in the level adjustment circuit 27 are equal to the reference signal 35 the output from the integrator 30 will be zero otherwise it will be proportional to the deviation from the assumed mean. To achieve this effect the integrator 30 may, for example, comprise a difference amplifier connected to receive the two input signals, with a feedback capacitor which, together with the resistors of the scaling circuit 28 acts as an integrator so that the difference and integration is performed in the one circuit assembly. The output signal from the integrator 30 is then fed via a switch 31 to another storage circuit 32 which holds the output of integrater 30 during the next accumulation of 100 or 1,000 signals, the output of the storage circuit 32 being displayed on a meter, digital voltmeter or means for permanently recording. This display is a measure of the value of the average deviation from the assumed mean of the previous 100 or 1,000 analog signals and can be scaled in suitable units by means of the scaling circuit 28.

I claim:

1. Apparatus for computing the standard deviation of a group of input signals, comprising
   an input line for receiving said input signals of said group,
   a plurality of temporary storage means,
   routing means interconnecting said input line and said temporary storage means, said routing means including a controllable switch in the input line to each said temporary storage means, and operating to direct said input signals to respective ones of said temporary storage means to form a plurality of sub-groups of said input signals, each said subgroup containing a predetermined number of said input signals,
   timing logic means producing first timing signals to control the opening of said controllable switches,
   a timing signal generator connected to provide timing signals to said timing logic means,
   range determining means connected to said temporary storage means for determining the statistical range of each said sub-group of said input signals, said range determining means producing an output signal representing said statistical range of each said sub-group of said input signals,
   scaling means connected to the output of said range determining means, said scaling means producing an output signal therefrom representing a predetermined proportion of the output signal from said range determining means determined with reference to the mean range factor for sub-groups containing said predetermined number of signals, and
   integrator means for summing said signals from said scaling means to produce an output signal representing a said predetermined proportion of the sum of said statistical ranges of said plurality of subgroups of said group of input signals, said output signal from said integrator means representing the standard deviation of said group of input signals., and
   means interconnecting said logic circuit means and said integrator means whereby said logic circuit means produces second timing signals to said integrator means at predetermined times with reference to said first timing signals periodically to enable said integrator means.

2. The apparatus of claim 1 wherein there are two said storage means and said sub-groups of said input signals comprise two of said signals.

3. The apparatus of claim 2 wherein said range determining means comprises a difference circuit the output from which represents the difference between the two said signals of each said sub-group in turn.

4. The apparatus of claim 1 wherein there are provided means displaying the output of said integrator means.

5. The apparatus of claim 1 wherein there are provided means for recording the output of said integrator means.

* * * * *